March 10, 1925.
W. E. WALKER
PLOW
Filed Jan. 18, 1921
1,528,863
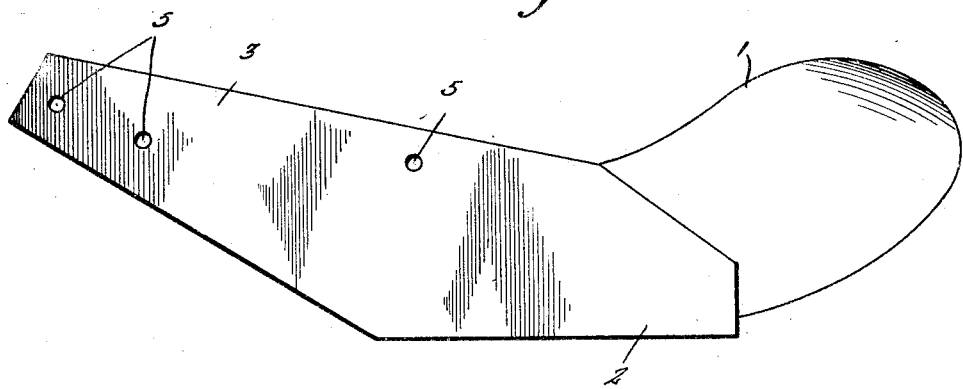
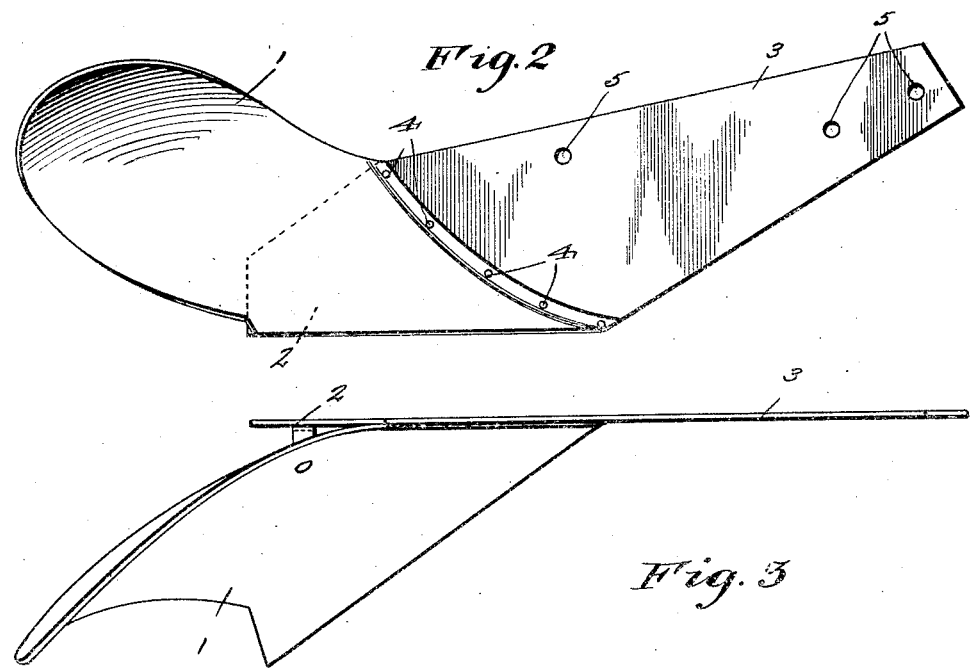
W. E. Walker INVENTOR Patented Mar. 10, 1925.

1,528,863

UNITED STATES PATENT OFFICE.

WALTER EARL WALKER, OF GARDEN PLAINS, ALBERTA, CANADA.

PLOW.

Application filed January 18, 1921. Serial No. 438,146.

*To all whom it may concern:*

Be it known that I, WALTER E. WALKER, a subject of the King of Great Britain, residing at Garden Plains, in the Province of Alberta and Dominion of Canada, have invented new and useful Improvements in Plows, of which the following is a specification.

This invention relates to a plow, the principal object of the invention being to provide a plow for cultivators, harrows and the like in order to turn over the top soil of the ground thus killing all weeds and making a dust mulch.

Another object of the invention is to so form the plow that it will ride over obstructions such as stones and the like without injuring any part of the implement.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side elevation of the invention.

Figure 2 is a like view looking towards the opposite side.

Figure 3 is a top plan view.

As shown in these views the plow consists of a mold board 1 and the land side 2, the land side having an extension 3 which extends forwardly and upwardly as shown. The mold board is secured to the plate forming the land side and its extension by rivets 4 or the like and the point of the mold board being integral therewith is connected with said plate at the junction of the lower edge of the extension with the lower straight edge of the land side. The extension is tapered as shown and its lower edge acts to cut the soil in front of the mold board and it will also ride over obstructions in or on the ground. This extension is provided with the holes 5 for receiving the bolts or rivets which connect the plow with the draw bar or bars and with the usual spring pressed bar which acts to force the plow into the ground. These parts are well known and need not be illustrated. This spring pressed rod will hold the plow in the ground but if an obstruction is encountered it will permit the plow to rise and thus prevent said plow from being broken or damaged. As soon as the plow passes the obstruction the spring pressed rod will force it into the ground again.

The plow is mainly designed for summer fallow and is adapted to be used in groups. Twelve plows may be used on a four-horse cultivator.

It will be seen that the land side and its extension will cut the sod or soil in advance of the plow so that the ground will easily be turned by the mold board. The inclined lower edge of the extension will also cause the plow to ride over obstructions and thus prevent injury to the parts. The mold board will turn over the soil similar to an ordinary plow and thus kill all weeds and thoroughly pulverize the soil.

It will of course be understood that any number of these devices may be attached to the cultivator or harrow and they may be arranged in any desired manner.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a plow, a land side having a straight lower edge, an apertured extension projecting from said land side at an upward inclination and being formed in tapered formation, a mold board secured to said extension at the juncture of the land side therewith and being curved outwardly from its connection and having its upper end terminating in a parallel plane with the upper end of the extension and said mold board having its lower edge in parallelism with the straight lower edge of the land side.

In testimony whereof I affix my signature.

WALTER EARL WALKER.